UNITED STATES PATENT OFFICE.

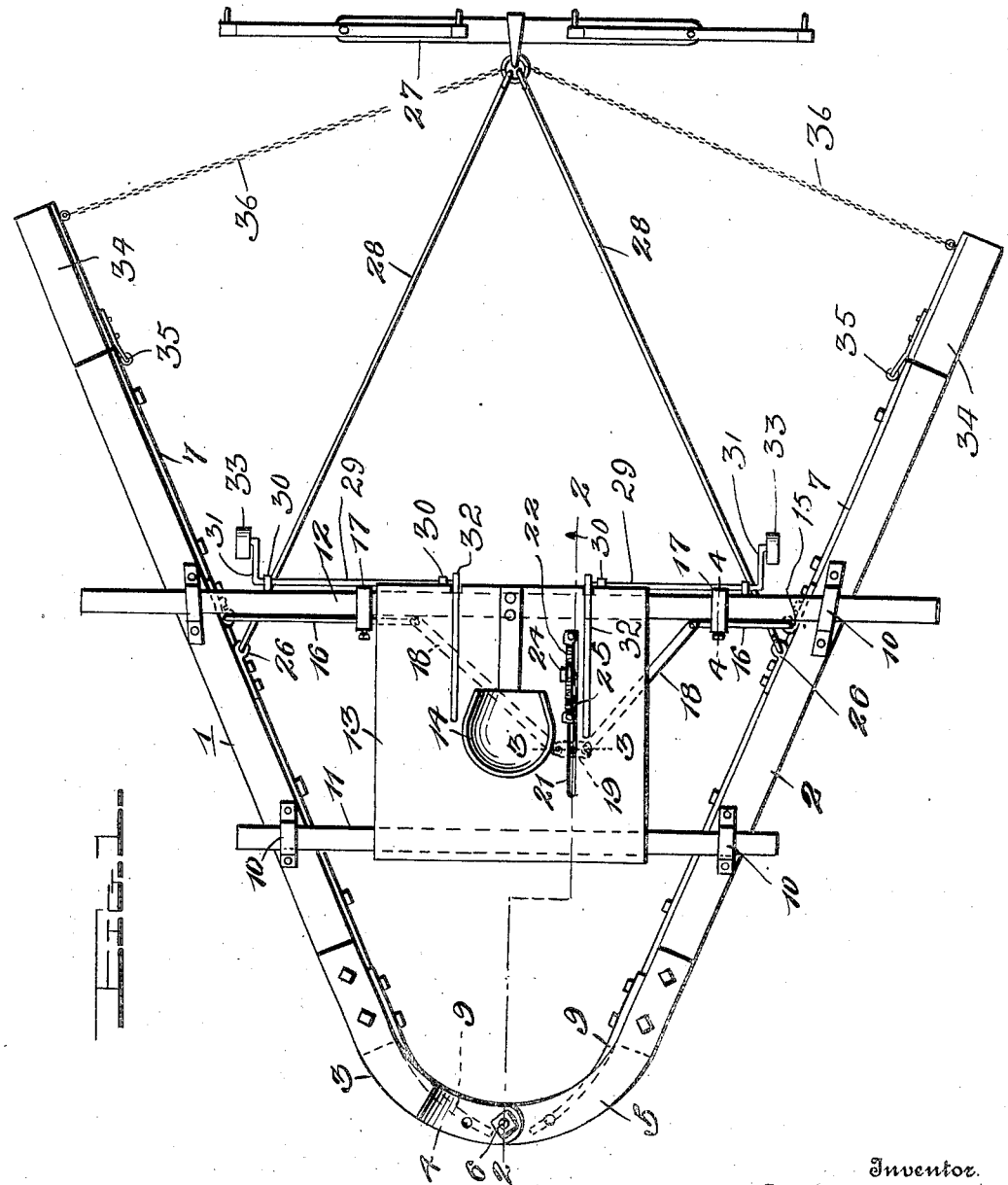

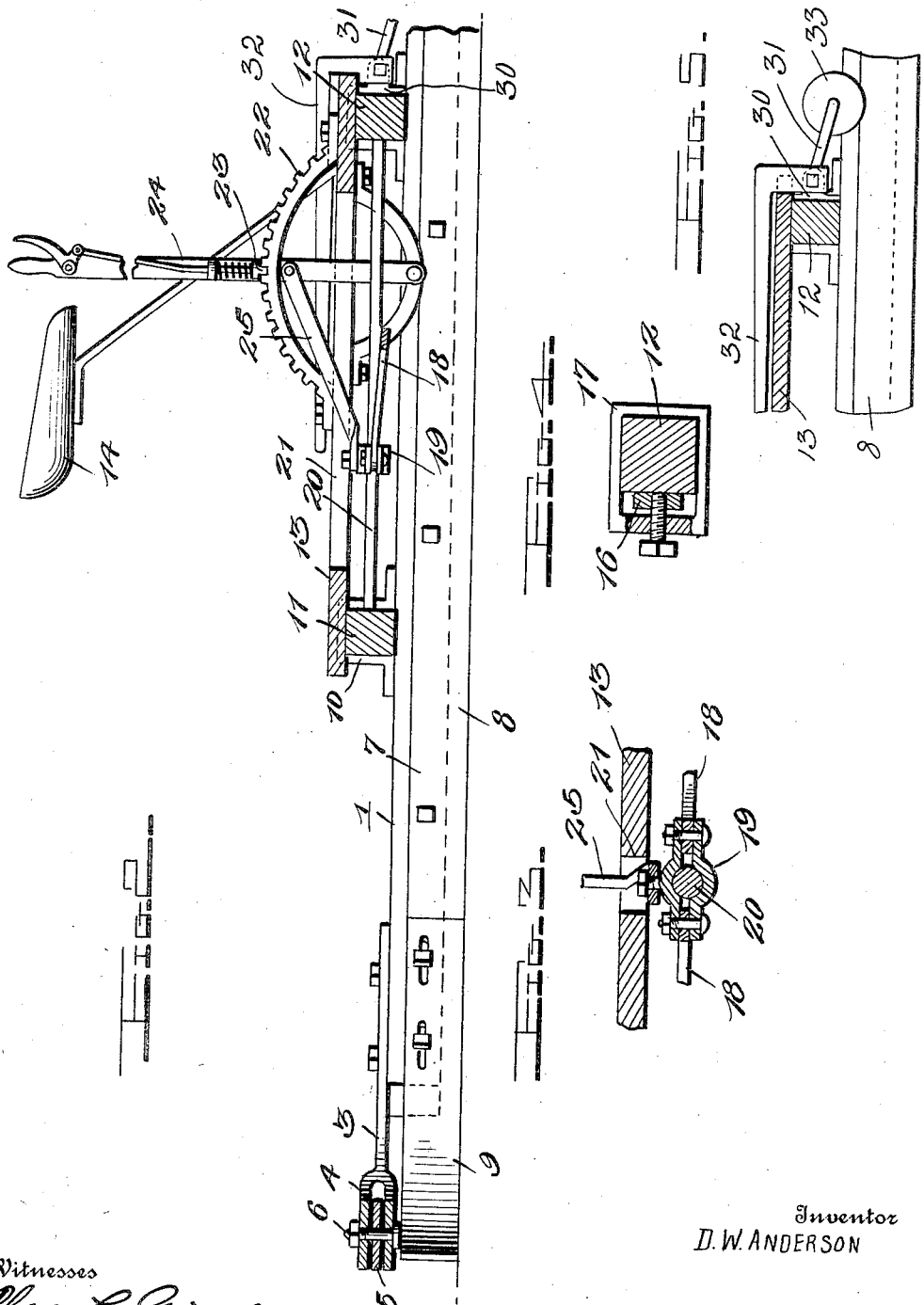

DAVID W. ANDERSON, OF CLEARFIELD, PENNSYLVANIA.

ROAD-DRAG.

1,086,501. Specification of Letters Patent. Patented Feb. 10, 1914.

Application filed July 7, 1913. Serial No. 777,749.

*To all whom it may concern:*

Be it known that I, DAVID W. ANDERSON, a citizen of the United States, residing at Clearfield, in the county of Clearfield and State of Pennsylvania, have invented certain new and useful Improvements in Road-Drags, of which the following is a specification, reference being had to the accompanying drawings.

This invention relates to new and useful improvements in road drags, the object of the invention being to provide a device of this character which is constructed of adjustable sections controlled by the operator so that the same may be quickly adjusted to a narrow or wide pathway.

Another object of the invention is to provide a device of this character which will possess advantages in points of efficiency and durability, is inexpensive to manufacture and at the same time is simple in construction and operation.

The invention has for a further object to provide improved means which may be easily and quickly actuated by the operator to elevate either of the drag bars so that the same may pass safely over an obstruction without injury to the machine.

With the above and other objects in view, the invention consists in the novel features of construction and the combination and arrangement of the parts hereinafter more fully described, pointed out in the claim and shown in the accompanying drawings, in which—

Figure 1 is a top plan view; Fig. 2 is a sectional view taken on the line 2—2 of Fig. 1; Fig. 3 is a sectional view on the line 3—3 of Fig. 1; Fig. 4 is a sectional view on the line 4—4 of Fig. 1. Fig. 5 is a detail view of one of the crank axles and its rocking lever.

Referring more particularly to the drawings, 1 and 2 indicate two diverging drag bars having the plates 3 secured to one end of one of the drag bars and curved inwardly as shown at 4. Secured to the other of the drag bars at one end thereof is a curved plate 5 which is adapted to be disposed between the outer ends of the plates 3 and pivotally secured by means of the bolt 6 forming a suitable hinge whereby the bars may swing to and from each other.

Secured to the inner sides of the bars 1 and 2 are the scraper blades 7 which extend beyond the lower face of the bars as shown at 8. Adjustably secured at their inner ends to the rear ends of the drag bars are the curved blades 9 which are adapted to be longitudinally adjusted so as to regulate the passage of the dirt through the rear ends of the bars, thus, if there is a large amount of dirt loosened by the scraper blades 7, the blades 9 will be adjusted inwardly so as to provide a larger opening at the rear of the drag, but if there is only a small amount of dirt being loosened by the blades 7 the blades 9 will be adjusted rearwardly so as to provide a narrow opening whereby a small amount of dirt will be readily piled in the rear of the drag.

Mounted upon the bars 1 and 2 and arranged in longitudinal spaced relation are the guide clips 10 in which are slidably mounted the ends of the transverse supporting bars 11 and 12, the bar 11 being arranged in the rear of the bar 12. Mounted upon the intermediate portions of the bars 11 and 12 is a suitable platform 13 upon which is mounted the driver's seat 14. Secured to the inner sides of the bars 1 and 2, by means of the bolts 15 are the rods 16 which are arranged in parallel relation with the supporting bar 12 and are held in position by means of the sliding guide clips 17. Pivotally secured to the inner ends of the rods 16 are the actuating levers 18, the other ends of which are pivotally secured to the block 19 which is slidably mounted upon a guide rod 20 arranged beneath the platform 13.

Mounted upon the platform 13 and arranged adjacent the elongated opening 21 is a rack 22 which is adapted to be engaged by a spring pawl 23 carried by the pivotally mounted lever 24. A rod 25 is provided, one end of which is pivotally secured to the block 19 and the other end pivotally secured to the lever 24 whereby the actuation of the lever 24 will slide the block 19 upon the guide rod 20 and move the drag bars 2 toward and away from the platform 13 so that either a narrow or wide pathway will be dragged, if desired.

Secured to the inner side of the drag bars 1 and 2 and arranged slightly to the rear of the cross bar 12 are the loops 26 to which the double-tree 27 is secured by means of the cables 28.

In the operation of my device, the dirt which is loosened by means of the scraper blades 7 passes to the rear of the drag where it is discharged through an opening formed by the adjustment of the blades 9 so that the loose dirt will be piled in a row where it may be quickly and easily moved from the road, if desired.

In order to obviate liability of injury to the machine by the engagement of the drag bars with obstructions, I provide a pair of shafts 29 mounted in suitable bearings 30 on the front face of the cross bar or beam 12. The outer end of each of these shafts is provided with a crank 31 while to the inner end of each shaft, a lever 32 is connected. This lever normally lies in close proximity to the upper surface of the platform, the forward end thereof being curved and provided with a rectangular opening to receive the end of the shaft. Upon each of the cranks 31 a roller or wheel 33 is mounted. From this construction, it will be obvious that when either one of the levers 32 is raised, the roller on the crank of the shaft which is thus turned or rocked in its bearings is thrown downwardly into engagement with the ground so that the corresponding side of the machine will be raised, thus elevating one of the drag bars, so that the same may pass safely over the obstruction.

In some instances, it may be desirable to lengthen the drag bars and to this end, I provide the bar sections 34 which are loosely connected as at 35 to the forward ends of the drag bars 1 and 2. A chain indicated at 36 connects each of these drag bar sections with the double-tree 27, and by simply taking up the links of this chain, the sections 34 may be disposed at any desired angle with relation to the drag bars 1 and 2. When it is not desired to employ the sections 34, the chains may be disconnected therefrom and said sections folded upwardly and backwardly upon the forward ends of the drag bars.

From the above description taken in connection with the accompanying drawings, it will be readily apparent that I have provided a simple and durable road drag whereby the scraper blades may be quickly adjusted to cover a narrow or wide pathway, as desired. It will also be seen that I have provided a device of this character which is extremely simple in its construction and at the same time can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the character described, the combination of diverging drag bars hingedly secured at one end, transverse bars having their ends slidably mounted upon the drag bars, a platform upon the transverse bars, rods secured to the drag bars and arranged in parallel relation with the transverse bars, an actuating lever having one end pivotally secured to the inner ends of said rods, a guide rod arranged beneath the platform, a block slidably mounted upon said guide rod and to which the other ends of the actuating levers are pivotally secured, and a pivoted lever mounted upon the platform and adapted to actuate said block upon the guide rod whereby the drag bars may be adjusted toward and away from each other.

In testimony whereof I hereunto affix my signature in the presence of two witnesses.

DAVID W. ANDERSON.

Witnesses:
M. C. LYDDANE,
JOSEPH C. ZIRKLE.